United States Patent
Kim et al.

(10) Patent No.: US 9,499,725 B2
(45) Date of Patent: Nov. 22, 2016

(54) ACRYLIC PRESSURE-SENSITIVE ADHESIVE COMPOSITIONS

(75) Inventors: Se Ra Kim, Daejeon (KR); In Cheon Han, Seoul (KR); Suk Ky Chang, Daejeon (KR); Ji Yeon Seong, Gyeonggi-do (KR)

(73) Assignee: LG Chem, Ltd., Seoul (KR)

( * ) Notice: Subject to any disclaimer, the term of this patent is extended or adjusted under 35 U.S.C. 154(b) by 652 days.

(21) Appl. No.: 12/450,894

(22) PCT Filed: Apr. 17, 2008

(86) PCT No.: PCT/KR2008/002170
§ 371 (c)(1),
(2), (4) Date: Apr. 5, 2010

(87) PCT Pub. No.: WO2008/130136
PCT Pub. Date: Oct. 30, 2008

(65) Prior Publication Data
US 2010/0188620 A1    Jul. 29, 2010

(30) Foreign Application Priority Data
Apr. 19, 2007  (KR) .................. 10-2007-0038506

(51) Int. Cl.
| C09K 19/00 | (2006.01) |
| C09J 133/08 | (2006.01) |
| C08K 5/00 | (2006.01) |
| C08K 5/19 | (2006.01) |

(52) U.S. Cl.
CPC ............ *C09J 133/08* (2013.01); *C08K 5/0075* (2013.01); *C08K 5/0091* (2013.01); *C08K 5/19* (2013.01); *C09J 2201/606* (2013.01); *Y10T 428/10* (2015.01); *Y10T 428/1041* (2015.01); *Y10T 428/1059* (2015.01); *Y10T 428/2891* (2015.01)

(58) Field of Classification Search
CPC ............ C09J 133/08; C09J 2201/606; C08K 5/0075; C08K 5/0091; C08K 5/19; Y10T 428/10; Y10T 428/1036; Y10T 428/1041; Y10T 428/1059; Y10T 428/1082; Y10T 428/2852; Y10T 428/2891; C07D 417/12; C07D 277/62

USPC ........... 428/1.31, 355 AC, 1.1, 1.5, 1.55; 349/96; 359/485.01, 485.03
See application file for complete search history.

(56) References Cited

U.S. PATENT DOCUMENTS

| 5,885,708 | A | 3/1999 | Lu et al. |
| 2002/0068222 | A1* | 6/2002 | Ishii et al. ..................... 429/347 |
| 2003/0008950 | A1* | 1/2003 | Chawla et al. ................. 524/83 |
| 2004/0014903 | A1* | 1/2004 | Musa .......................... 525/333.9 |
| 2005/0197450 | A1 | 9/2005 | Amano et al. |
| 2011/0042697 | A1 | 2/2011 | Lee et al. |

FOREIGN PATENT DOCUMENTS

| CN | 1667071 A | 9/2005 |
| CN | 101031628 A | 9/2007 |
| JP | 09-512567 A | 12/1997 |
| JP | 2001-512508 | 8/2001 |
| JP | 2004-175960 A | 6/2004 |
| JP | 2004-520667 A | 7/2004 |
| JP | 2005-108678 A | 4/2005 |
| JP | 2005-314476 A | 11/2005 |
| JP | 2006-045315 A | 2/2006 |
| JP | 2006-152235 A | 6/2006 |
| KR | 10-2006-0047584 A | 5/2006 |
| KR | 10-2006-0100261 A | 9/2006 |
| KR | 10-2006-0128659 A | 12/2006 |
| TW | 2006-00544 | 1/2006 |
| TW | 2007-02410 | 1/2007 |
| TW | 200904246 A | 1/2009 |
| WO | WO 98/36005 | 8/1998 |
| WO | WO 98/36005 A1 | 8/1998 |
| WO | WO 2006/022512 A1 | 3/2006 |
| WO | WO 2006/132488 A1 | 12/2006 |
| WO | WO 2007/029681 A1 | 3/2007 |

* cited by examiner

*Primary Examiner* — Ruiyun Zhang
(74) *Attorney, Agent, or Firm* — Dentons US LLP

(57) ABSTRACT

The present invention relates to an acrylic pressure-sensitive adhesive composition, and more particularly, to an acrylic pressure-sensitive adhesive composition, which comprises (a) 100 weight parts of an acrylic copolymer, (b) 0.001 to 30 weight parts of an antistatic agent; and (c) 0.01 to 10 weight parts of a corrosion inhibitor, thereby being optically transparent, causing durability and reliability not to change, and simultaneously improving antistatic performance and preventing generation of corrosion although the adhesive composition comes into contact with a metal surface.

5 Claims, No Drawings

ACRYLIC PRESSURE-SENSITIVE ADHESIVE COMPOSITIONS

This application claims the benefit of PCT/KR2008/002170 filed on Apr. 17, 2008, 2008 along with Korean Patent Application No. 10-2007-0038506 filed on Apr. 19, 2007, both of which are hereby incorporated herein by reference for all purposes in their entirety.

TECHNICAL FIELD

The present invention relates to an acrylic pressure-sensitive adhesive composition, and more particularly, to an acrylic pressure-sensitive adhesive composition, which comprises (a) 100 weight parts of an acrylic copolymer, (b) 0.001 to 30 weight parts of an antistatic agent; and (c) 0.01 to 10 weight parts of a corrosion inhibitor, thereby being optically transparent, causing durability and reliability not to change, and simultaneously improving antistatic performance and preventing generation of corrosion although the adhesive composition comes into contact with a metal surface.

BACKGROUND ART

In entry into information industry, static electricity causes various problems in electronic components. In general, static electricity includes triboelectrification generated when rubbing two different objects together, and release electrification generated when objects in close contact with each other are released from each other. The static electricity can cause suction of foreign materials such as dust, electrostatic breakdown of devices, misoperation of measuring instruments, or fires. Further, it is very likely that contemporary electronic devices are temporarily or permanently damaged by static electricity.

For instance, static electricity is generated when a release film is peeled off from a pressure-sensitive adhesive layer to bond a polarizer to a liquid crystal cell during the fabrication of a liquid crystal display. Such generated static electricity affects alignment of liquid crystal within the liquid crystal display to cause defects.

Further, as polarizers are fabricated at high speeds, a breaking phenomenon of TFT IC devices occurs to result in defects of a liquid crystal display panel by static electricity that has not been generated in an existing process when a polarizer protective film is peeled off.

Although there is a method for forming an antistatic layer on an outer surface of a polarizer in order to suppress the generation of static electricity, there is a problem in that the generation of static electricity has not been fundamentally prevented since an effect of the method is insignificant. Therefore, it is necessary to impart antistatic performance to a pressure-sensitive adhesive in order to fundamentally suppress the generation of static electricity.

Although the pressure-sensitive adhesive is excellent in static electricity-preventing performance when an ionic antistatic agent is added to the pressure-sensitive adhesive to impart antistatic performance thereto, there has been a problem in that the metal surface is corroded when the pressure-sensitive adhesive comes into contact with a metal surface. Undoubtedly, a pressure-sensitive adhesive that requires antistatic properties is generally used in insulating material products from which static electricity is generated easily. However, the pressure-sensitive adhesive requiring antistatic properties is useful in a case where antistatic properties as well as corrosion resistance are required since the possibility that the pressure-sensitive adhesive is partially brought into contact with the metal surface cannot be excluded. For instance, in case of a protective film for a polarizer, in which a metallic material called a bezel is fixed to an outer surface of the polarizer with which a pressure-sensitive adhesive of the protective film has come into contact, there has been a problem in that the bezel is deteriorated by corrosion.

Methods for imparting antistatic function to a pressure-sensitive adhesive include a method for adding conductive metal powder or carbon particles to a pressure-sensitive adhesive, and a method for adding an ionic material such as a surfactant to a pressure-sensitive adhesive. However, the method for adding conductive metal powder or carbon particles to a pressure-sensitive adhesive has problems in that a large amount of conductive metal powder or carbon particles are used so as to exhibit antistatic properties and transparency of the pressure-sensitive adhesive is deteriorated accordingly. Furthermore, the method for adding surfactant has problems in that the pressure-sensitive adhesive is easily influenced by humidity, and adhesive properties of the pressure-sensitive adhesive are deteriorated due to migration of the surfactant to the surface of the pressure-sensitive adhesive.

As a method for imparting antistatic performance to a pressure-sensitive adhesive, Japanese Patent Laid-open Publication No. H5-140519 discloses a method for suppressing the generation of static electricity by adding an ethylene oxide-modified dioctyl phthalate plasticizer to a pressure-sensitive adhesive such that the pressure-sensitive adhesive is flexible. Further, Japanese Patent Laid-open Publication No. 2004-287199 discloses a method for imparting antistatic performance to a pressure-sensitive adhesive by adding an ion conductive polymer with a hydroxyl group to a pressure-sensitive adhesive.

However, these methods have problems in that the pressure-sensitive adhesive is transferred to a surface of a polarizer, adhesion properties and rheological properties are changed, and corrosion prevention cannot be controlled.

In the meantime, several methods for preparing a pressure-sensitive adhesive that does not corrode a metal layer have been suggested. Japanese Patent Laid-open Publication No. 2005-325250 discloses only a method in which components of a carboxyl group-containing copolymer pressure-sensitive adhesive is not used.

Therefore, it is necessary to further study a pressure-sensitive adhesive which is optically transparent, causes durability and reliability not to change, and simultaneously improves antistatic performance and prevents generation of corrosion although the acrylic pressure-sensitive adhesive comes into contact with a metal surface.

DISCLOSURE

Technical Problem

The present invention is conceived to solve the aforementioned problems in the prior art. An object of the present invention is to provide an acrylic pressure-sensitive adhesive composition which is optically transparent, causes durability and reliability not to change, and simultaneously improves antistatic performance and prevents generation of corrosion although the acrylic pressure-sensitive adhesive composition comes into contact with a metal surface.

Another object of the present invention is to provide a protective film and a polarizer comprising an adhesive layer containing an acrylic pressure-sensitive adhesive composition having the aforementioned excellent physical properties.

A further object of the present invention is to provide a liquid crystal display device comprising the polarizer.

Technical Solution

According to the present invention for achieving the objects, there is provided an acrylic pressure-sensitive adhesive composition, which comprises (a) an acrylic copolymer, (b) an antistatic agent, and (c) a corrosion inhibitor.

In addition, the present invention provides a protective film, which comprises a substrate, and a pressure-sensitive adhesive layer formed on one or both surfaces of the substrate and containing the acrylic pressure-sensitive adhesive composition according to the present invention.

Further, the present invention provides a polarizer, which comprises a polarizing film or polarizing device, and a pressure-sensitive adhesive layer containing the acrylic pressure-sensitive adhesive composition according to the present invention.

The present invention also provides a liquid crystal display device, which comprises a liquid crystal display panel in which the aforementioned polarizer is bonded to one or both surfaces of a liquid crystal cell.

Best Mode

Hereinafter, the present invention will be described in detail.

The present inventors confirmed that the problem that a metal surface is corroded when a pressure-sensitive adhesive comes into contact therewith although static electricity preventing performance thereof is superior can be improved by adding an antistatic agent into the pressure-sensitive adhesive.

Furthermore, the present inventors have found out that addition of a corrosion inhibitor does not deteriorate the antistatic performance, but further improves the antistatic performance and prevents corrosion of the metal surface at the same time due to the synergistic effect. That is, the corrosion inhibitor has a structure with a large dipole moment in its structural characteristics. Accordingly, the present invention has been completed by finding out that the corrosion inhibitor can maximize the effect of the antistatic agent since the corrosion inhibitor increases dissociation force of an ionic antistatic agent.

Therefore, it is characterized in that the present invention comprises an antistatic agent as well as a corrosion inhibitor in an acrylic pressure-sensitive adhesive composition.

In a pressure-sensitive adhesive composition according to the present invention, respective components are implemented as follows.

(a) Acrylic Copolymer

Although the acrylic copolymer used in the present invention is not particularly limited if the acrylic copolymer is used as a general pressure-sensitive adhesive in the art, it is preferable that the acrylic copolymer comprise (i) 90 to 99.9 weight parts of a (meth)acrylate ester monomer with an alkyl group having 1 to 12 carbon atoms, and (ii) 0.1 to 10 weight parts of a vinyl-based monomer and/or an acryl-based monomer having a cross-linkable functional group.

The (meth)acrylate ester monomer with an alkyl group having 1 to 12 carbon atoms of (i) is methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylbutyl(meth)acrylate, 2-ethylhexyl(meth)acrylate, n-octyl(meth)acrylate, isooctyl(meth)acrylate, isononyl(meth)acrylate, or a mixture of two or more thereof.

The (meth)acrylate ester monomer with an alkyl group having 1 to 12 carbon atoms is preferable contained in the content of 90 to 99.9 weight parts, wherein the initial adhesion is deteriorated if the content of the (meth)acrylate ester monomer is less than 90 weight parts, and a durability problem can be generated due to the deterioration of cohesion if the content of the (meth)acrylate ester monomer exceeds 99.9 weight parts.

The vinyl-based monomer and/or an acryl-based monomer with a cross-linkable functional group of (ii) reacts with a cross-linking agent thereby serving to impart cohesion or adhesion caused by chemical bonding to the pressure-sensitive adhesive such that cohesion of a pressure-sensitive adhesive is not broken at high temperature or high humidity.

The vinyl-based monomer and/or the acryl-based monomer with a cross-linkable functional group may include a monomer containing a hydroxyl group such as 2-hydroxyethyl(meth)acrylate, 2-hydroxypropyl(meth)acrylate, 4-hydroxybutyl(meth)acrylate, 6-hydroxyhexyl(meth)acrylate, 2-hydroxyethyleneglycol(meth)acrylate, or 2-hydroxypropyleneglycol(meth)acrylate; a monomer containing a carboxyl group such as (meth)acrylic acid, acrylic acid dimer, itaconic acid, maleic acid, maleic anhydride, or fumaric acid; a monomer containing nitrogen such as acryl amide, N-vinyl pyrrolidone, or N-vinyl caprolactam; or a mixture of two or more thereof.

0.1 to 10 weight parts of the vinyl-based monomer and/or the acryl-based monomer with a cross-linkable functional group is preferably contained in the acrylic copolymer. If the content of the vinyl-based monomer and/or the acryl-based monomer is less than 0.1 weight part, there is a problem in that the vinyl-based monomer and/or the acryl-based monomer with a cross-linkable functional group is easily subjected to cohesion failure at high temperature and high humidity; and if the content of the vinyl-based monomer and/or the acryl-based monomer exceeds 10 weight parts, there are problems in that its compatibility is reduced to cause severe surface migration thereof, rheological properties are reduced, and stress relaxation property is deteriorated due to increase in cohesion thereof.

Further, it is preferable that the acrylic copolymer of the present invention comprises a comonomer as an optional component in order to control glass transition temperature of the pressure-sensitive adhesive or impart other functionalities thereto when preparing the acrylic copolymer of the present invention.

Although any acrylic adhesive resins with a glass transition temperature of −130 to 50° C. in a non-cross linked state as general monomers having copolymerizable vinyl groups may be used as the comonomer, a vinyl-based monomer of the following Formula 1 is preferably used as the comonomer.

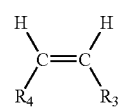

[Formula 1]

where $R_4$ denotes hydrogen or alkyl, and $R_3$ denotes cyano, alkyl substituted or non-substituted phenyl, acetyloxy, or $COR_5$, wherein $R_5$ denotes alkyl substituted or non-substituted amino or glycidyloxy.

Although preferable examples of the functional monomers include acrylonitrile, (meth)acrylamide, N-methylacrylamide, styrene, methylstyrene, glycidyl(meth)acrylate, and vinylacetate, the functional monomers are not limited thereto, and the monomers may be used solely or in the form of a mixture of at least two thereof.

An acrylic copolymer comprising the aforementioned components may be prepared by general methods including a solution polymerization process, a photopolymerization process, a bulk polymerization process, a suspension polymerization process, or an emulsion polymerization process, and particularly, the acrylic copolymer is preferably prepared by the solution polymerization process. At this time, it is preferable that the polymerization temperature be 50 to 140° C. and an initiator be mixed with the monomers uniformly mixed.

(b) Antistatic Agent

As the antistatic agent used in the present invention, any ionic antistatic agent may be used if it is excellent in compatibility with the pressure-sensitive adhesive, does not affect transparency, durability and reliability, and can suppress the generation of static electricity through dissociation of ions.

Preferably, the antistatic agent is contained in the content of 0.001 to 30 weight parts with respect to 100 weight parts of an acrylic copolymer. The antistatic agent has a problem in that antistatic performance is deteriorated if the content is less than 0.001 weight part, while the antistatic agent has a problem of poor durability and reliability due to low cohesion if the content exceeds 30 weight parts.

Specifically, it is preferable that the antistatic agent be at least one selected from the group consisting of:

(i) an inorganic salt comprised of metal cation and anion;
(ii) an organic salt comprised of onium cation and anion;
(iii) a mixture of the inorganic salt and a chelate agent capable of forming a bond with the metal ions of the inorganic salt;
(iv) a mixture of the inorganic salt and a compound having at least one ether bond in a molecule.

Preferably, the anion of the inorganic or organic salt is selected from the group consisting of iodide ($I^-$), chloride ($Cl^-$), bromide ($Br^-$), nitrate ($NO_3^-$), sulfonate ($SO_4^-$), methylbenzenesulfonate ($CH_3(C_6H_4)SO_3^-$), carboxybenzenesulfonate ($COOH(C_6H_4)SO_3^-$), benzonate ($C_6H_5COO^-$), perchlorate ($ClO_4^-$), hydroxide ($OH^-$), trifluoroacetate ($CF_3COO^-$), trifluoromethanesulfonate ($CF_3SO_2^-$), tetrafluoroborate ($BF_4^-$), tetrabenzylborate ($B(C_6H_5)_4^-$), hexafluorophosphate ($PF_6^-$), bis(trifluoromethanesulfonyl)imide ($N(SO_2CF_3)_2^-$), bis(pentafluoroethanesulfonyl)imide ($N(SOC_2F_5)_2^-$), bis(pentafluoroethanecarbonyl)imide ($N(COC_2F_5)_2^-$), bis(perfluorobutanesulfonyl)imide ($N(SO_2C_4F_9)_2^-$), bis(perfluorobutanecarbonyl)imide ($N(COC_4F_9)_2^-$), tris(trifluoromethanesulfonyl)methide ($C(SO_2CF_3)_3^-$), and tris(trifluoromethanecarbonyl)methide ($C(SO_2CF_3)_3^-$). However, the anion of the inorganic salt or the organic salt is not limited thereto. Imide-based anions are more preferable since anions performing an electron withdrawing function well and substituted with fluorine having good hydrophobicity increase ion stability.

Further, the metal cation includes alkaline metal cation or alkaline earth metal cation. The metal cation is preferably selected from the group consisting of lithium ($Li^+$), sodium ($Na^+$), potassium ($K^+$), rubidium ($Rb^+$), cesium ($Cs^+$), beryllium ($Be^{2+}$), magnesium ($Mg^{2+}$), calcium ($Ca^{2+}$), strontium ($Sr^{2+}$) and barium ($Ba^{2+}$), is more preferably selected from lithium ($Li^+$), sodium ($Na^+$), potassium ($K^+$), cesium ($Cs^+$), beryllium ($Be^{2+}$), magnesium ($Mg^{2+}$), calcium ($Ca^{2+}$), and barium ($Ba^{2+}$), and is most preferably lithium ($Li^+$) which has high ion stability and moves in an adhesive more easily.

Furthermore, nitrogen onium cation, phosphorus onium cation, or sulfur onium cation is preferably used as the onium cation. Here, the term "onium" means plus-charged ions comprising at least some of electric charges which are maldistributed on at least a nitrogen, phosphorus, or sulfur atom.

In addition, the onium cation may be an acyclic cation or a cyclic cation in which atom(s) forms a cycle. The cyclic cation may be an aromatic saturated or unsaturated cation. The cyclic cation may contain at least one heterocyclic atom, e.g., oxygen and sulfur, in addition to nitrogen, phosphorus, or sulfur, and be optionally substituted by a substituent such as hydrogen, halogen, alkyl, and aryl. The acyclic cation may retain an organic substituent or an R group to which at least one (preferably at least four) nitrogen is bonded, and the residual substituent is hydrogen. The R group may be a cyclic or acyclic group, a substituted or non-substituted group, or an aromatic or non-aromatic group, and contain at least one heteroatom such as nitrogen, oxygen, sulfur, phosphorus, and halogen.

Particularly, the nitrogen onium cation is preferably at least one selected from the group consisting of acyclic quaternary ammonium, and an aromatic ammonium salt selected from pyridinium, pyridazinium, pyrimidinium, pyrazinium, imidazolium, pyrazolium, thiazolium, oxazolium, and triazolium.

Most preferably, the nitrogen onium cation is at least one selected from the group consisting of tetraalkylammonium $[N^+(C_nH_{2n+1})_4$: n=1~8]; N-alkylpyridinium $[N—C_nH_{2n+1}$-cyc-$N^+C_5H_5$: n=4~16]; 1,3-alkylmethylimidazolium $[CH_3$-cyc-$(N^+C_2H_2NCH)CnH_{2n+1}$: n=2~10]; and 1,2-dimethyl-3-alkylimidazolium $[CH_3$-cyc-$(N^+C_2H_2NC(CH_3))C_nH_{2n+1}$: n=2~10].

In the meantime, in a case where an inorganic salt comprised of metal cation and anion is used as an antistatic agent, it is preferable to use (iii) a mixture of the inorganic salt and a chelate agent capable of forming a bond with the metal ions of the inorganic salt; or (iv) a mixture of the inorganic salt and a compound having at least one ether bond in a molecule.

The chelate agent usable in the present invention is a compound having a functional group capable of forming a bond with metal ions in the molecular structure, and forms a stabilized chelate complex compound by bonding with the cation of a metal salt dissociated into cation and anion. Therefore, the anion concentration of the metal salt increases in a pressure-sensitive adhesive, so that ionic conductivity is retained in a pressure-sensitive adhesive composition. The ionic conductivity lowers release electrification by imparting conductivity to the pressure-sensitive adhesive composition, thereby reducing static electricity generated when a release film for protecting a pressure-sensitive adhesive layer is peeled off and when the protective film is peeled off after a protective film adheres to an adherent.

The chelate agent is preferable if it is dissolved into general organic solvents such as ethylacetate, toluene, methylethylketone, acetone and alcohols at a high solubility and has excellent compatibility with an acrylic pressure-sensitive adhesive. Specifically, the chelate agent includes a compound having an oxalate group, a compound having a diamine group, a compound having a polyfunctional carboxyl group, a compound having β-ketone group, a compound having an oxime group, or a mixture of at least two thereof. Particularly, the compound having an oxalate group is preferably used.

Preferably, the compound having an oxalate group is a compound represented by the following Formula 2:

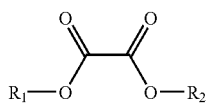

[Formula 2]

where $R_1$ and $R_2$ are each independently hydrogen, halogen, a linear or branched alkyl group with 1 to 20 carbon atoms, a linear or branched alkoxy group with 1 to 20 carbon atoms, a linear or branched alkenyl group with 2 to 20 carbon atoms, an aryl group with 6 to 30 carbon atoms, an arylalkyl group with 6 to 30 carbon atoms, an aryloxy group with 6 to 30 carbon atoms, or a cycloalkyl group with 5 to 20 carbon atoms.

A specific example of the compound represented by Formula 2 includes diethyloxalate, dimethyloxalate, dibutyloxalate, di-tert-butyloxalate, and bis(4-methylbenzyl)oxalate.

Preferably, the compound having a diamine group is a compound represented by the following Formula 3:

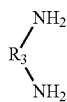

[Formula 3]

where $R_3$ is a linear or branched alkylene group with 1 to 10 carbon atoms, or a linear or branched alkenylene group with 2 to 10 carbon atoms.

A specific example of the compound represented by Formula 3 includes ethylenediamine, 1,2-diaminopropane, or diaminobutane.

Further, the compound having a polyfunctional carboxyl group is preferably a compound comprising a functional group represented by the following Formula 4a, 4b, or 4c as a compound with polycarboxylic acid or carboxylate group:

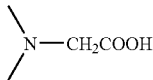

[Formula 4a]

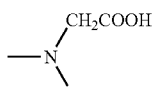

[Formula 4b]

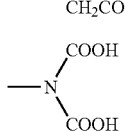

[Formula 4c]

A specific example of the compound comprising a functional group represented by Formula 4a or 4b includes ethylenediamine-N,N,N'N'-tetraacetic acid (EDTA), N,N,N'N''N''-diethylenetriaminepentaacetic acid (DTPA), 1,4,7,10-tetraazacyclododecane-N,N'N''N'''-tetraacetic acid (DOTA), 1,4,7,10-tetraazacyclododecane-N,N'N''-triacetic acid (DO3A), trans(1,2)-cyclohexano diethylenetriaminepentaacetic acid, or N,N-biscarboxymethylglycine.

A specific example of the compound comprising a functional group represented by Formula 4c includes the following Formulae 4c-1 to 4c-5:

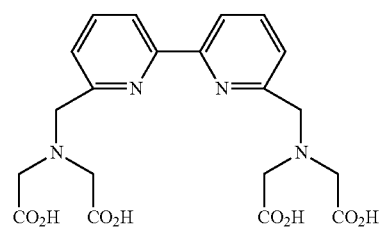

[Formula 4c-1]

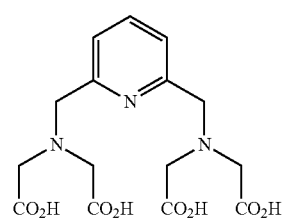

[Formula 4c-2]

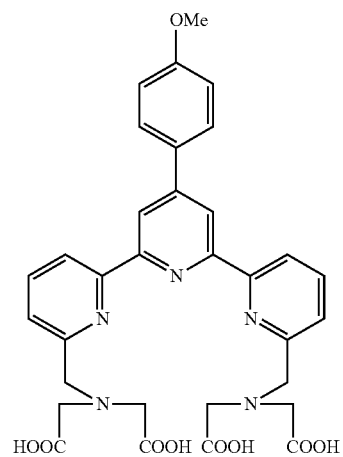

[Formula 4c-3]

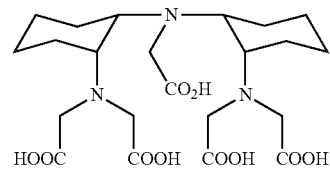

[Formula 4c-4]

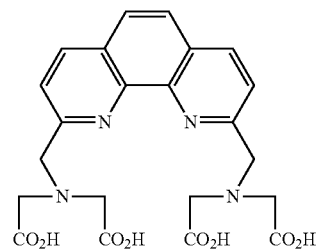

[Formula 4c-5]

Meanwhile, the compound having β-ketone group is preferably a compound represented by the following Formula 5:

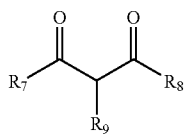

[Formula 5]

where $R_7$ and $R_8$ are each independently a linear or branched alkyl group with 1 to 20 carbon atoms, a linear or branched alkoxy group with 1 to 20 carbon atoms, a linear or branched alkenyl group with 2 to 20 carbon atoms, an aryl group with 6 to 30 carbon atoms, an arylalkyl group with 6 to 30 carbon atoms, an aryloxy group with 6 to 30 carbon atoms, or a cycloalkyl group with 5 to 20 carbon atoms; and $R_9$ is hydrogen, a linear or branched alkyl group with 1 to 20 carbon atoms, a linear or branched alkoxy group with 1 to 20 carbon atoms, a linear or branched alkenyl group with 2 to 20 carbon atoms, an aryl group with 6 to 30 carbon atoms, an arylalkyl group with 6 to 30 carbon atoms, an aryloxy group with 6 to 30 carbon atoms, or a cycloalkyl group with 5 to 20 carbon atoms.

A specific example of the compound represented by Formula 5 includes 2,4-pentadion, 1-benzoylacetone, or ethyl acetoacetate.

The chelate agent capable of forming a bond with the metal ions is preferably contained in a content of 0.1 to 10 weight parts with respect to 1 weight part of the inorganic salt. If the content is less than 0.1 weight part, there is a problem in that antistatic performance is deteriorated since the chelate agent is not sufficiently bonded with the inorganic salt; while if the content exceeds 10 weight parts, there is a problem in that the cohesion is lowered to make durability and reliability weak.

Further, the aforementioned compound having at least one ether bond in the molecule used in the present invention serves to improve antistatic performance by forming an ether bond, an inorganic salt and a complex in the molecule, thereby providing ionic conductivity and a stable structure.

Preferably, the compound having at least one ether bond in a molecule is a compound represented by the following Formula 6:

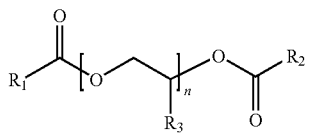

[Formula 6]

where $R_1$ and $R_2$ are each independently an alkyl group having 1 to 20 carbon atoms or aryl group, preferably an alkyl group with 4 to 12 carbon atoms, or an aryl group with 6 to 12 carbon atoms such as a phenyl group or a naphthyl group;

$R_3$ is hydrogen or a methyl group; and n is an integer of 2 to 20, preferably 2 to 17.

A specific example of Formula 6 includes diethyleneglycoldi-2-ethylhexonate, tetraethyleneglycoldi-2-ethylhexonate, polyethyleneglycoldi-2-ethylhexonate, triethyleneglycoldiethylbutyrate, polyethyleneglycoldiethylbutyrate, polypropyleneglycoldiethylhexonate, triethyleneglycoldibenzonate, tetraethyleneglycol dibenzonate, polyethyleneglycoldibenzonate, polypropyleneglycoldibenzonate, polyethyleneglycol-2-ethylhexonatebenzonate, or a mixture of at least two thereof.

Further, an inorganic salt mixed with the compound represented by Formula 6 to form a mixture is a conjugate base of superacid, and is preferably a metal salt represented by the following Formula 7 consisting of a perfluoroalkyl group-containing anion and an alkaline metal cation.

[Formula 7]

where M is an alkali metal, preferably lithium, sodium or potassium;

$R_f$ is a perfluoroalkyl group with 1 to 4 carbon atoms; and

Y is carbon or sulfur, X is nitrogen or carbon, m is 1 or 2, and n is 2 or 3, wherein m=1 if Y is carbon, m=2 if Y is sulfur, n=2 if X is nitrogen, and n=3 if X is carbon.

The alkali metal salt is excellent in compatibility with a pressure-sensitive adhesive and optically transparent under damp-heat resistant conditions due to low coordinate bonding and high hydrophobic properties to metal cations due to a resonance structure of anions and high electronegativity of fluorine atoms.

The alkali metal salt represented by Formula 7 can impart an effect of antistatic properties even though the alkali metal salt is added alone. However, the alkali metal salt is used together with an ester-based plasticizer having at least one ether bond in the molecule, so that antistatic properties can be more effectively provided. At the same time, there is an effect that ionic conductivity is enhanced.

The anion in the alkali metal salt represented by Formula 7 includes bis(trifluoromethanesulfonyl)imide, bis(pentafluoroethanesulfonyl)imide, bis(pentafluoroethanecarbonyl)imide, bis(perfluorobutanesulfonyl)imide, bis(perfluorobutanecarbonyl)imide, tris(trifluoromethanesulfonyl)methide, or tris(trifluoromethanecarbonyl)methide.

Preferably, the ester-based compound having at least one ether bond in the molecule is contained in a content of 0.1 to 10 weight parts with respect to 1 weight part of the inorganic salt. If the content is less than 0.1 weight part, the ester-based compound has a problem in that antistatic performance is deteriorated since the ester-based compound does not react with the alkali metal salt sufficiently to form a complex, while if the content exceeds 10 weight parts, the ester-based compound has a problem in that durability of the pressure-sensitive adhesion is weakened due to low cohesion.

(c) Corrosion Inhibitor

The corrosion inhibitor used in the present invention serves to perform a metal corrosion preventing action of a pressure-sensitive adhesive comprising an ionic antistatic agent to thereby prevent discoloration of the pressure-sensitive adhesive. Additionally, the addition of the corrosion inhibitor further improves antistatic performance of the pressure-sensitive adhesive by the synergistic effect.

Preferably, the corrosion inhibitor includes a compound which contains at least one atom such as phosphorus, sulfur, nitrogen or oxygen well adsorbed onto a substrate, and can have low reactivity with other additives and prevent access of oxygen or water due to structural steric hindrance. Preferably, the corrosion inhibitor includes at least one selected from the group consisting of a (benzo)triazole-based compound; a (benzo)thiazole-based compound; a (benzyl)imidazole-based compound; an imidazoline-based compound; a quinoline-, pyridine-, or pyrimidine-based compound; an indole-based compound or its derivative; an amine-based compound; a urea-based compound; sodiumbenzoate; benzylmercapto; di-sec-butylsulfide; and diphenylsulfoxide. However, the corrosion inhibitor is not limited thereto.

A specific example of the corrosion inhibitor includes (benzo)triazole-based compounds such as benzotriazole, phenyl triazole, or tolytriazole; (benzo)thiazole-based compounds such as 2-mercaptobenzothiazole, 2-amino-3-mercapto-1,3,4-thiadiazole, or 1,3,4-thiadiazole-2,5-dithiol; (benzyl)imidazole-based compounds such as 5,6-dimethylbenzylimidazole, 2-mercaptobenzylimidazole, imidazole, 1-phenyl-4-methylimidazole, 4-methylimidazole, 4-bromoimidazole, ethyl-4-methyl-5-imidazole carboxylate, 5-hydroxy methyl-4-methylimidazole, or 4-methyl-5-imidazole carboxylic acid; imidazoline-based compounds such as imidazoline, or 1-ethylamino-2-octadecylimidazoline; pyrimidine-based compounds such as 2-mercaptopyrimidine, or 2,4-dimercaptopyrimidine; indole-based compounds such as indole, isatin, 3-amino-1H-isoindole or indazole, and derivatives thereof; amine-based compounds such as methylamine, diethylamine, n-decylamine, morpholine, or arylamine; and urea-based compounds such as phenylthiourea or urea. These compounds may be used solely or in the form of a mixture of at least two thereof.

The corrosion inhibitor is preferably contained in the content of 0.01 to 10 weight parts. There is a problem in that a metal corrosion preventing effect is insufficient if the content is less than 0.01 weight part while durability and reliability is weakened due to low adhesion properties and cohesion if the content exceeds 10 weight parts.

(d) Cross-Linking Agent

The acrylic pressure-sensitive adhesive composition of the present invention comprising the aforementioned components may further comprise a polyfunctional cross-linking agent if necessary.

The polyfunctional cross-linking agent serves to increase cohesion of an adhesive by reacting with a carboxylic group, a hydroxyl group and the like.

As the polyfunctional cross-linking agent, isocyanate-based compounds, epoxy-based compounds, aziridine-based compounds, metal chelate-based compounds and the like may be used, and particularly, an isocyanate-based cross-linking agent is preferably used.

The isocyanate-based compound includes toluene diisocyanate, xylene diisocyanate, diphenylmethane diisocyanate, hexamethylene diisocyanate, isoform diisocyanate, tetramethylxylene diisocyanate, naphthalene diisocyanate, or reactants thereof with polyols such as trimethylolpropane or the like.

The epoxy-based compound includes ethylene glycol diglycidyl ether, triglycidyl ether, trimethylolpropane triglycidyl ether, N,N,N,N-tetraglycidylethylenediamine, or glycerindiglycidylether.

The aziridine-based compound includes N,N'-toluene-2, 4-bis(1-aziridinecarboxide), N,N'-diphenylmethane-4,4'-bis (1-aziridinecarboxide), triethylene melamine, or tris(1-aziridinyl)phosphine oxide.

In addition, the metal chelate-based compound includes compounds in which polyvalent metals such as aluminum, iron, zinc, tin, titanium, antimony, magnesium and vanadium are coordinated with acetylacetone or ethyl acetoacetate.

The aforementioned polyfunctional cross-linking agent can be subjected to a uniform coating process only when a cross-linking reaction of a functional group of the cross-linking agent hardly occurs in a blending process carried out to form an adhesion layer. The coating process is completed and then drying and aging processes are performed to thereby form a cross-linking structure, so that an adhesive layer with elasticity and strong cohesion can be obtained. Cutting properties and pressure-sensitive adhesive properties such as durability and reliability in pressure-sensitive adhesive products are improved by the strong cohesion of the pressure-sensitive adhesive.

The aforementioned polyfunctional cross-linking agent is preferably contained in a content range of 0.01 to 10 weight parts with respect to 100 weight parts of the acrylic copolymer. If the polyfunctional cross-linking agent is contained in the content range, the pressure-sensitive adhesive is excellent in cohesion and has excellent durability and reliability since the problems in pressure-sensitive adhesive durability such as bubbling and peeling are not generated, and a rising phenomenon and the like does not occur.

Additive

The acrylic pressure-sensitive adhesive composition of the present invention comprising the aforementioned components can further comprise a silane-based coupling agent or an adhesion imparting resin if necessary.

The silane-based coupling agent improves adhesion stability when an acrylic pressure-sensitive adhesive adheres to a glass plate, thereby serving to further improve heat resistance and humidity resistance. Particularly, the silane-based coupling agent facilitates to improve adhesion reliability when the acrylic pressure-sensitive adhesive is left alone under high temperature and high humidity conditions for a long time.

The silane-based coupling agent includes
γ-glycidoxypropyltrimethoxysilane,
γ-glycidoxypropylmethyldiethoxysilane,
γ-glycidoxypropyltriethoxysilane,
3-mercaptopropyltrimethoxysilane,
vinyltrimethoxysilane, vinyltriethoxysilane,
γ-methacryloxypropyltrimethoxysilane,
γ-methacryloxypropyltriethoxysilane,
γ-aminopropyltrimethoxysilane, γ-aminopropyltriethoxysilane,
3-isocyanatepropyltriethoxysilane,
γ-acetoacetatepropyltrimethoxysilane, or a mixture of at least two thereof.

The silane-based coupling agent is preferably contained in a content range of 0.005 to 5 weight parts with respect to 100 weight parts of the acrylic copolymer. If the silane-based coupling agent is contained in the content range, adhesion stability and adhesion reliability of the silane-based coupling agent are improved under high temperature and high humidity conditions.

Meanwhile, the adhesion imparting resin serves to adjust adhesion performance of the acrylic pressure-sensitive adhesive.

The adhesion imparting resin includes a hydrogenated hydrocarbon resin, a hydrogenated rosin resin, a hydrogenated rosin ester resin, a hydrogenated terpene resin, a hydrogenated terpene phenolic resin, a polymerized rosin resin, a polymerized rosin ester resin, or a mixture of at least two thereof.

The adhesion imparting resin is preferably contained in a content range of 1 to 100 weight parts with respect to 100 weight parts of the acrylic copolymer. If the adhesion imparting resin is contained in the content range, compatibility and cohesion of the pressure-sensitive adhesive is improved.

Further, the acrylic pressure-sensitive adhesive composition of the present invention may further comprise, if necessary, additives such as an acrylic oligomer, an epoxy resin, a hardener, a ultraviolet stabilizer, an antioxidant, a toning agent, a reinforcing agent, a filler, a defoaming agent, a surfactant, and a plasticizer.

The acrylic pressure-sensitive adhesive composition of the present invention comprising the aforementioned components may be prepared by general processes, and specifically a thermal curing process, a photo curing process, or the like.

Preferably, the aforementioned acrylic pressure-sensitive adhesive composition of the present invention has a cross-linking density of 5 to 95%. A pressure-sensitive adhesive has low cohesion and problems in pressure-sensitive adhesive durability such as bubbling and peeling if the cross-linking density is less than 5% while problems such as a rising phenomenon and the like are generated to thereby weakening durability and reliability if the cross-linking density exceeds 95%.

The present invention is also directed to a protective film, which comprises a substrate, and an adhesive layer formed on one or both surfaces of the substrate and containing the acrylic pressure-sensitive adhesive composition according to the present invention.

The protective film, which is a layer for protecting an optical film, preferably a surface of a polarizer, comprises a substrate and a pressure-sensitive adhesive layer.

The substrate is not particularly limited, but includes polyester-based films such as cellulose, polycarbonate and polyethylene terephthalate having transparency; polyester-based films such as polyethersulfone; and polyolefin-based films such as polyethylene, polypropylene, polyolefin with a cyclic or norbornene structure, or ethylene propylene copolymer.

The transparent substrate film may be formed to have a single-layered or two-or-more-layered structure, and thickness of the substrate film can be properly selected according to applications of the substrate film. Particularly, the thickness of the substrate film is preferably 5 to 500 µm, more preferably 10 to 100 µm.

Further, in order to improve close adhesion of the substrate with a pressure-sensitive adhesive, one or both surfaces of the transparent substrate film may be subjected to a surface treatment process or a primer treatment process, and an antistatic layer or an anti-smudge layer may be formed thereon.

A method for forming a pressure-sensitive adhesive layer on the substrate film is not particularly limited. For instance, it is possible to use a method for drying a pressure-sensitive adhesive applied to a surface of the substrate film directly using a bar coater or the like, or a method for applying a pressure-sensitive adhesive to a surface of a releasable substrate, drying it, transferring the pressure-sensitive adhesive layer formed on the surface of the releasable substrate to a surface of a substrate film, and aging it. Here, the thickness of the pressure-sensitive adhesive layer is preferably in a range of 2 to 100 µm, more preferably in a range of 5 to 50 µm. If the pressure-sensitive adhesive layer is deviated from the thickness range, it is hard to obtain a uniform pressure-sensitive adhesive layer, to thereby result in non-uniform physical properties of a pressure sensitive adhesive film.

The present invention is also directed to a polarizer comprising a polarizing film or polarizing device, and a pressure-sensitive adhesive layer containing the acrylic pressure-sensitive adhesive composition according to the present invention.

The polarizing film or polarizing device of the polarizer is not particularly limited. For instance, the polarizing film includes a film manufactured by stretching a film of a polyvinyl alcohol-based resin in which polarizing components such as iodine, dichroic dye, and the like are contained. The thickness of the polarizing film is also not particularly limited, and the polarizing film may be formed to have a general thickness.

The polyvinyl alcohol-based resin includes polyvinyl alcohol, polyvinyl formal, polyvinyl acetal, and hydrolysates of ethylene-vinyl acetate copolymer.

A multilayered film may be formed by laminating protective films including cellulose-based films such as triacetyl cellulose; polycarbonate films, or polyester-based films such as polyethylene terephthalate; polyethersulfone-based films; or polyolefin-based films such as polyethylene, polypropylene, polyolefin having cyclic or norbornene structure and ethylene-propylene copolymer; on both surfaces of the polarizing film. The thickness of the protective film is not particularly limited, and may be formed to have a general thickness.

A method for forming a pressure-sensitive adhesive layer on the polarizing film is not particularly limited. For instance, it is possible to use a method for drying a pressure-sensitive adhesive applied to a surface of the polarizing film directly using a bar coater or the like, or a method for applying a pressure-sensitive adhesive to a surface of a releasable substrate, drying it, transferring the pressure-sensitive adhesive layer formed on the surface of the releasable substrate to a surface of a polarizing film, and aging it.

In addition, at least one layer for providing additional functions, including a protective layer, a reflective layer, an anti-glare layer, a retardation plate, a wide-viewing-angle compensation film, and a brightness enhancing film may be laminated on the polarizer of the present invention, and the pressure-sensitive adhesive layer according to the present invention may also be formed on the functional layer.

The present invention is also directed to a liquid crystal display device comprising a liquid crystal display panel in which a polarizer is bonded to one or both surfaces of a liquid crystal cell. A polarizer to which the pressure-sensitive adhesive of the present invention is applied is applicable to all of general liquid crystal display devices, and types of liquid crystal display panels are not particularly limited. Preferably, it is possible to implement a liquid crystal display device comprising a liquid crystal display panel in which the polarizer to which the pressure-sensitive adhesive is applied is bonded to one or both surfaces of a liquid crystal cell.

The aforementioned acrylic pressure-sensitive adhesive composition of the present invention may be applied to industrial sheets, particularly protective films, reflective sheets, adhesive sheets for structures, adhesive sheets for photographs, adhesive sheets for marking of traffic lanes, adhesive articles for optics, and adhesive for electronic components. Additionally, the acrylic pressure-sensitive adhesive composition may also be applied to multilayered laminate products, i.e., application fields with the same operating concept including general commercial adhesive sheets, medical patches, heat activated pressure-sensitive adhesives, and the like.

Hereinafter, preferred examples are shown in order to help understand the present invention. However, the following examples are only for illustrative purposes, and the present invention is not limited to the following examples.

Example 1

Preparation of Acrylic Copolymer 100 weight parts of ethyl acetate (EAc) was injected into a reactor after injecting a monomer mixture comprising 94.9 weight parts of n-butylacrylate (n-BA), 4.5 weight parts of acrylic acid (AA), and 0.6 weight part of hydroxyethylmethacrylate (2-HEMA) into the reactor with a volume of 1 L having a cooler installed thereto to make a reflux of nitrogen gas and easily control temperature of the reactor. Then, temperature of the mixture was maintained at 62° C. after purging the nitrogen gas for one hour so as to remove oxygen. After uniformly maintaining the mixture, 0.03 weight part of azobisisobutyronitrile (AIBN), which had been diluted to a concentration of 50% into ethyl acetate, as a reaction initiator, was injected, and the resulting material reacted for 8 hours to prepare an acrylic copolymer.

(Mixing Process)

A uniform pressure-sensitive adhesive layer with a thickness of 25 μm was prepared by injecting 100 weight parts of the prepared acrylic copolymer, 0.5 weight part of toluene diisocyanate adduct (TDI-1) of isocyanate-based trimethylolpropane as a cross-linking agent, 5.2 weight parts of lithium bis(trifluoromethanesulfonyl)imide (A-1) as an antistatic agent, and 8.0 weight parts of 2-mercaptobenzothiazole (B-1) as a corrosion inhibitor into a reactor, diluting the acrylic copolymer to a proper concentration, uniformly mixing the diluted material, coating a releasing paper with the mixture, and drying it.

(Laminating Process)

The prepared adhesive layer was laminated to an iodine-based polarizer with a thickness of 185 μm.

Examples 2 to 4 and Comparative Examples 1 to 4

Polarizers were manufactured in the same manner as in Example 1 except that components and composition represented by the following Table 1 were used in Example 1. The unit used in Table 1 is weight part.

Durability and reliability, surface resistance, occurrence or not of corrosion were measured by the following methods for the polarizers manufactured in Examples 1 to 4 and Comparative Examples 1 to 4. The measuring results are shown on the following Table 2.

(A) Durability and Reliability

The polarizers (90 mm×70 mm) manufactured in Examples 1 to 4 and Comparative Examples 1 to 4 adhered to both surfaces of glass substrates (110 mm×90 mm×0.7 mm) in a state where optical absorption axes crossed. Here, a pressure of 5 kg/cm² was applied in order to prevent bubbles or foreign materials from being generated. The samples were observed to check if bubbling or releasing was generated after leaving the samples alone under a temperature of 60° C. and a relative humidity of 90% for 1000 hours in order to grasp damp heat resistance of the samples. After leaving the samples alone at room temperature for 24 hours, the durability and reliability were checked on the samples just before evaluating the states of the samples, wherein evaluation references include ○: no bubbling or peeling phenomenon, Δ: more or less of bubbling or peeling phenomenon, and x: bubbling or peeling phenomenon.

(B) Surface Resistance

After removing release films from the polarizers manufactured in Examples 1 to 4 and Comparative Examples 1 to 4, surface resistance of pressure-sensitive adhesive surfaces of the polarizers were measured. Here, the measured surface resistance was observed after applying a voltage of 500 V to the polarizers under a temperature of 23° C. and a relative humidity of 50% for one minute. It was generally considered to be no antistatic performance when the surface resistance was at least $10^{13} \Omega/\square$.

(C) Corrosion Resistance

After cutting the polarizers manufactured in Examples 1 to 4 and Comparative Examples 1 to 4 to have a dimension of 50 mm×50 mm, the cut polarizers adhered to surfaces of metal such as copper or aluminum. After leaving the samples for measurement alone under a temperature of 60° C. and a relative humidity of 90% for 1000 hours, corrosion degrees of the samples were observed, wherein evaluation references include ○: no discoloration on metal surfaces due to no corrosion, Δ: partial discoloration of metal surfaces due to slight corrosion, and x: discoloration of metal surfaces due to corrosion.

TABLE 1

| Classification | | Examples | | | | Comparative examples | | | |
|---|---|---|---|---|---|---|---|---|---|
| | | 1 | 2 | 3 | 4 | 1 | 2 | 3 | 4 |
| Acrylic copolymer | n-BA | 94.9 | 77.6 | 94.9 | 84.5 | 77.6 | 84.5 | 94.9 | 77.6 |
| | EA | | 20.5 | | | 20.5 | | | 20.5 |
| | MA | | | | 10.1 | | 10.1 | | |
| | AA | 4.5 | | 4.5 | 5.4 | | 5.4 | 4.5 | |
| | 2-HEMA | 0.6 | 1.9 | 0.6 | | 1.9 | | 0.6 | 1.9 |
| Cross-linking agent | | 0.5 | 0.5 | 0.5 | 0.5 | 0.5 | 0.5 | 0.5 | 0.5 |
| Antistatic agent | A-1 | 5.2 | 0.2 | 1.5 | | | | 5.2 | 0.2 |
| | A-2 | | 18.4 | | | | | | |
| | A-3 | | | 4.2 | | | | | |
| | A-4 | | | | 0.5 | 0.5 | | | |
| Corrosion inhibitor | B-1 | 8.0 | | 1.2 | | | | 19.4 | |
| | B-2 | | 0.3 | | 2.1 | | | | 0.001 |
| | B-3 | | | 0.5 | | | | | | n-BA: n-butylacrylate
EA: ethylacrylate
MA: methylacrylate
AA: acrylic acid
2-HEMA: 2-hydroxyethylmethacrylate
A-1: lithium bis(trifluoromethanesulfonyl)imide
A-2: tetraethyleneglycol di-2-ethylhexonate
A-3: di-tert-butyloxalate
A-4: tetrabutylammonium bis(trifluoromethanesulfonyl)imide
B-1: 2-mercaptobenzothiazole
B-2: benzotriazole
B-3: 5-amino-1,3,4-thiazole-2-thiol

TABLE 2

| | 80° C., 1000 hrs. | 60° C., 90% R.H., 1000 hrs. | Surface resistance ($\Omega/\square$) | Occurrence or not of corrosion |
|---|---|---|---|---|
| | Durability and reliability | | | |
| Example 1 | ○ | ○ | $1.4 \times 10^9$ | ○ |
| Example 2 | ○ | ○ | $8.1 \times 10^{11}$ | ○ |
| Example 3 | ○ | ○ | $3.9 \times 10^{10}$ | ○ |
| Example 4 | ○ | ○ | $7.0 \times 10^{10}$ | ○ |
| Comparative Example 1 | ○ | ○ | $7.4 \times 10^{14}$ | ○ |
| Comparative Example 2 | ○ | ○ | $8.1 \times 10^{11}$ | X |
| Comparative Example 3 | X | X | $2.6 \times 10^8$ | X |
| Comparative Example 4 | ○ | ○ | $9.2 \times 10^{12}$ | Δ |

As shown in Table 2, it can be seen that the polarizers of Examples 1 to 4 comprising the acrylic pressure-sensitive adhesive composition containing the antistatic agent and the corrosion inhibitor according to the present invention do not generate corrosion and are excellent in durability and reliability and antistatic performance as compared with Comparative Examples 1 to 4.

Advantageous Effects

An acrylic pressure-sensitive adhesive according to the present invention is optically transparent, causes durability and reliability not to change, and simultaneously improves antistatic performance and prevents generation of corrosion although the acrylic pressure-sensitive adhesive composition comes into contact with a metal surface.

Although the present invention has been explained in detail in connection with the specific embodiments descried herein, it will be apparent to those skilled in the art that various modifications and changes can be made thereto within the scope of the present invention. It will also be apparent that such modifications and changes are within the appended claims.

The invention claimed is:

1. An adhesive polarizer, comprising:
   a polarizing film or polarizing device; and
   a pressure-sensitive adhesive layer formed on one or both surfaces of the polarizing film or polarizing device, and to bond a polarizer to a liquid crystal cell,
   wherein the pressure-sensitive adhesive layer comprises:
   (a) 100 weight parts of an acrylic copolymer;
   (b) 0.001 to 30 weight parts of an antistatic agent; and
   (c) 0.3 to 10 weight parts of a corrosion inhibitor that is at least one selected from the group consisting of a (benzo)thiazole-based compound; a (benzyl)imidazole-based compound; an imidazoline-based compound; a quinoline-, pyridine-, or pyrimidine-based compound; an indole-based compound or its derivative; an amine-based compound; a urea-based compound; sodiumbenzoate; benzylmercapto; di-sec-butylsulfide; and diphenylsulfoxide, and wherein the (benzo)thiazole-based compound is 2-mercaptobenzothiazole, 2-amino-3-mercapto-1,3,4 thidiazole or 1,3,4-thidiazole-2,5-dithiol,
   wherein the antistatic agent is a mixture of a metal salt represented by the following Formula 7; and a compound selected from the group consisting of diethyleneglycoldi-2-ethylhexonate, tetraethyleneglycoldi-2-ethylhexonate, polyethyleneglycoldi-2-ethylhexonate, triethyleneglycoldiethylbutyrate, polyethyleneglycoldiethylbutyrate, polypropyleneglycoldiethylhexonate, triethyleneglycoldibenzonate, tetraethyleneglycol dibenzonate, polyethyleneglycoldibenzonate, polypropyleneglycoldibenzonate and polyethyleneglycol-2-ethylhexonatebenzonate:

[Formula 7]

where M is lithium, sodium or potassium;
Rf is a perfluoroalkyl group with 1 to 4 carbon atoms; and
Y is carbon or sulfur, X is nitrogen or carbon, m is 1 or 2, and n is 2 or 3.

2. The adhesive polarizer as claimed in claim 1, wherein the acrylic copolymer comprises:
   (i) 90 to 99.9 weight parts of a (meth)acrylate ester monomer with an alkyl group having 1 to 12 carbon atoms; and
   (ii) 0.1 to 10 weight parts of a vinyl-based monomer and/or an acryl-based monomer having a cross-linkable functional group.

3. The adhesive polarizer as claimed in claim 1, wherein the pressure-sensitive adhesive layer further comprises 0.01 to 10 weight parts of a polyfunctional cross-linking agent with respect to 100 weight parts of the acrylic copolymer.

4. The adhesive polarizer as claimed in claim 1, wherein the polarizer further comprising at least one layer selected from the group consisting of a protective layer, a reflective layer, an anti-glare layer, a retardation plate, a wide-viewing-angle compensation film, and a brightness enhancing film.

5. A liquid crystal display device comprising a liquid crystal display panel, wherein the polarizer according to claim 1 is bonded to one or both surfaces of a liquid crystal cell.

* * * * *